Feb. 26, 1929.   1,703,468
J. H. BIESEN
REFRIGERATING APPARATUS
Original Filed July 7, 1926
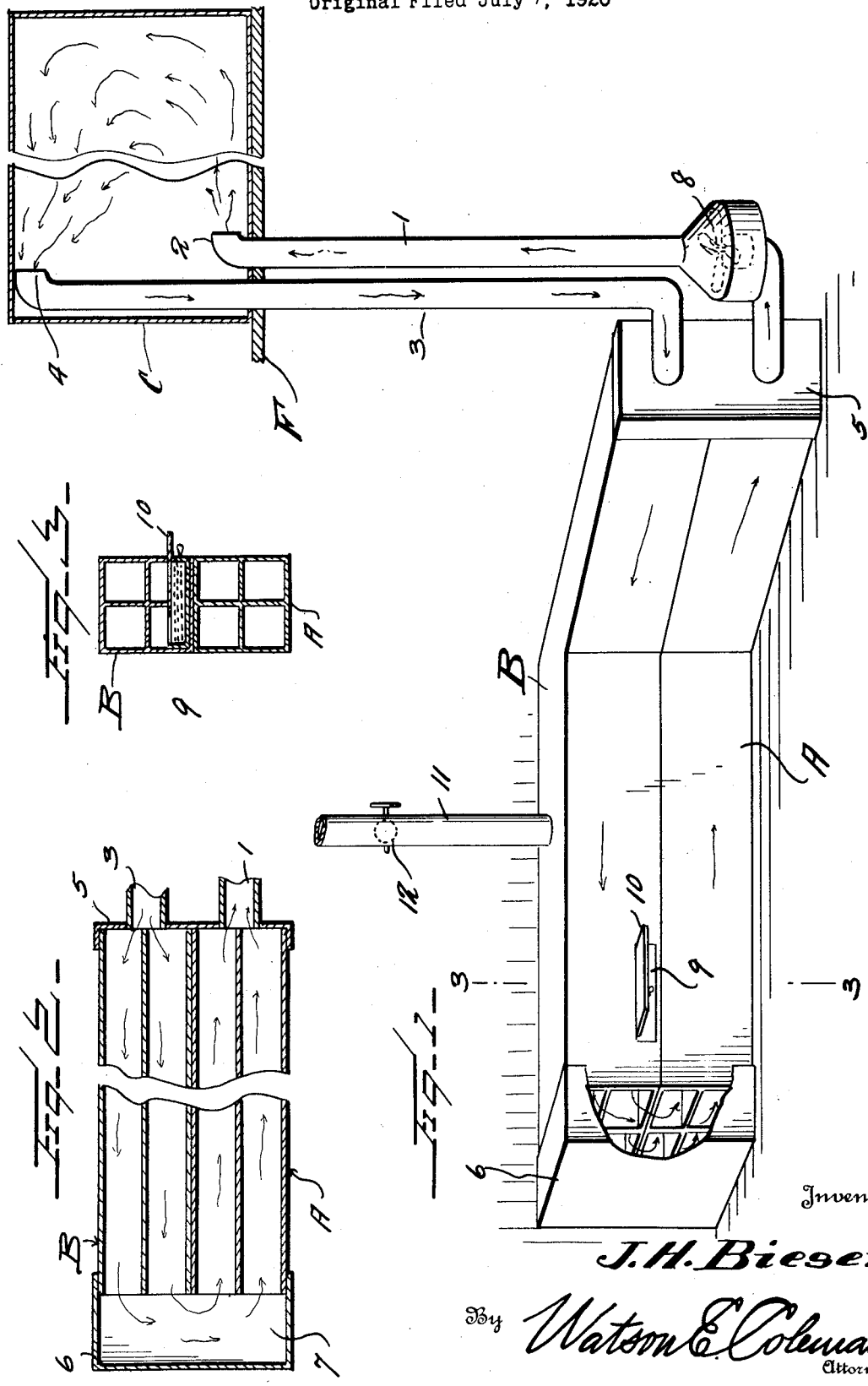
Inventor
J. H. Biesen
By Watson E. Coleman
Attorney Patented Feb. 26, 1929.

1,703,468

UNITED STATES PATENT OFFICE.

JAMES H. BIESEN, OF CEDAR RAPIDS, IOWA, ASSIGNOR OF ONE-THIRD TO OTTO BALCAR AND ONE-THIRD TO JOHN A. BALCAR, BOTH OF CEDAR RAPIDS, IOWA.

REFRIGERATING APPARATUS.

Application filed July 7, 1926, Serial No. 120,996. Renewed July 17, 1928.

This invention relates to refrigerating apparatus and it is an object of the invention to provide an apparatus of this kind whereby air under circulation is employed as the preservation medium.

It is also an object of the invention to provide an apparatus of this kind particularly adapted for the preservation of meats and which operates to subject the meat or the like to a current of air resulting in the formation of a film or coating over the same making a perfect seal of all the pores of the meat and thereby prevent deterioration.

Another object of the invention is to provide an apparatus of this kind embodying a chamber for containing the meat or the like to be preserved together with means for effecting a circulation of air therethrough and wherein means are provided for admitting fresh air as may be required.

The invention consists in the details of construction and in the combination and arrangement of the several parts of my improved refrigerating apparatus whereby certain important advantages are attained and the device rendered simpler, less expensive and otherwise more convenient and advantageous for use, as will be hereinafter more fully set forth.

The novel features of my invention will hereinafter be definitely claimed.

In order that my invention may be the better understood, I will now proceed to describe the same with reference to the accompanying drawings, wherein:—

Figure 1 is a view partly in perspective and partly in section and of somewhat a diagrammatic character illustrating a refrigerating apparatus constructed in accordance with an embodiment of my invention;

Figure 2 is a fragmentary longitudinal sectional view taken vertically through the conduits;

Figure 3 is a sectional view taken substantially on the line 3—3 of Figure 1.

As disclosed in the accompanying drawings, C denotes a container or box of any desired type or construction in which is adapted to be placed meat, poultry or the like to be preserved and which, as herein disclosed, rests upon a floor F. In communication with the interior of the container or box C through the bottom thereof is an inlet pipe 1. This communication of the pipe 1 is also adjacent to an end of the container or box. The pipe 1 extends within the container or box C but slightly above the bottom thereof and terminates in an angularly disposed nozzle 2 directed toward the opposite end portion of the container or box C.

Extending within the container or box C through the bottom thereof but at a point adjacent to the pipe 1 is an outlet pipe 3. This pipe 3 terminates adjacent to the top of the container or box C and at its upper end is provided with a lateral nozzle 4 facing in substantially the same direction as the nozzle 2. The locations of the nozzles 2 and 4 are such that as the air is delivered within the container or box C it will thoroughly circulate within such container and box and pass out through the pipe 3.

If there be a cellar or other relatively cool room below the floor F, I arrange in said room, preferably immediately next to the wall thereof, the superimposed conduits A and B. Each of these conduits is formed of tile and engaged with similar ends of the conduits A and B is a cap 5 fitting closely thereagainst so that air is prevented from passing out such ends of the conduits from one conduit to the other. The intake pipe 1 is in communication with the lower conduit A through such applied cap 5 while the outlet pipe 3 is in communication with the upper conduit B through such cap.

Disposed over the opposite ends of the conduits A and B is a cap 6 which, when applied, provides a chamber 7 in communication with both of the conduits and at the same time readily permits air to circulate through the upper conduit B to and through the lower conduit A.

Interposed in the pipe 1 is a fan mechanism 8 of any desired type which operates to draw the air from within the conduit A up through the pipe 1 and with sufficient force to cause the air to effectively circulate within the container or box C and then pass out through the pipe 3 and to and through the upper conduit B. By this means, a continuous circulation of air is assured and by having the conduits A and B positioned within a cellar or other relatively cool room it is assured that the air entering within the container or box C is of proper temperature. In practice, it has been fully established that air of a temperature of seventy degrees or less will operate effectively to preserve the meat or the like within the container or box C.

As the air passes through the tiled conduits A and B such air is effectively dehydrated and which is further facilitated by the relatively rapid travel of the air therethrough. This dehydration is due to the fact that the tile will absorb the moisture in the air. However, to offset this dehydration I find it of advantage to insert within the upper conduit B a pan 9 adapted to contain brine whereby a moistening medium is provided to counterbalance the dehydration action hereinbefore referred to.

This pan 9, as herein disclosed, is provided with a sliding lid 10 for regulating the moistening of the air through the medium of the brine within the pan.

While I have hereinbefore stated that the conduits A and B may be placed within a room or cellar of requisite temperature they can, if desired, be buried beneath the ground or otherwise positioned as the occasions of practice may necessitate in order to obtain the desired cooling action of the air passing therethrough.

In communication with the upper conduit B and preferably centrally thereof is a pipe line 11 leading to the outside atmosphere, the flow through such pipe line being under control of the interposed damper or valve 12. This pipe line 11 together with the damper or valve 12 provides a regulable means to permit a further supply of air being carried to the container or box C.

As hereinbefore stated, the fan mechanism 8 may be as desired but I wish to state that in practice I prefer that it be of a type operated through the instrumentality of an electric motor.

As the air circulates within the box or container C it results in the formation of a film or coating over the surface of the meat or the like to be preserved which results in the sealing of the pores so that the accumulation of mould is prevented. As is known, mould is a vegetable growth and, therefore, in order to grow it must have something upon which to fasten itself, but by the formation of the film or coating which seals the pores a surface is produced upon which the mould cannot lodge.

It has also been found in actual practice that with the use of my apparatus as herein disclosed, it is not necessary that the meat or the like be treated by handling in any way, such as turning, and it has also been established in practice that the air circulated by my improved apparatus does not in any way effect the inherent characteristics of the material, such as shrinkage or reduction in weight.

From the foregoing description it is thought to be obvious that a refrigerating apparatus constructed in accordance with my invention is particularly well adapted for use by reason of the convenience and facility with which it may be assembled and operated, and it will also be obvious that my invention is susceptible of some change and modification without departing from the principles and spirit thereof and for this reason I do not wish to be understood as limiting myself to the precise arrangement and formation of the several parts herein shown in carrying out my invention in practice except as hereinafter claimed.

I claim:—

1. An apparatus for preserving meat or the like comprising, in combination, a normally closed container for holding the material to be preserved, superimposed conduits having similar ends closed and the opposite ends in communication, said conduits being arranged in an external atmosphere of a temperature lower than the temperature of the atmosphere surrounding the container, an outlet pipe in communication with one of the conduits through the closed end thereof and leading within the container to the upper portion thereof, a second pipe in communication with the second conduit through the closed end thereof and leading within the container to the lower portion thereof, and a fan mechanism for circulating air through the container, pipes and conduits.

2. An apparatus for preserving meat or the like comprising, in combination, a normally closed container for holding the material to be preserved, superimposed conduits having similar ends closed and the opposite ends in communication, said conduits being arranged in an external atmosphere of a temperature lower than the temperature of the atmosphere surrounding the container, an outlet pipe in communication with one of the conduits through the closed end thereof and leading within the container to the upper portion thereof, a second pipe in communication with the second conduit through the closed end thereof and leading within the container to the lower portion thereof, and a fan mechanism for circulating air through the container, pipe and conduits, the walls of the conduits being of tile.

3. An apparatus for preserving meat or the like comprising, in combination, a normally closed container for holding the material to be preserved, superimposed conduits having similar ends closed and the opposite ends in communication, said conduits being arranged in an external atmosphere of a temperature lower than the temperature of the atmosphere surrounding the container, an outlet pipe in communication with one of the conduits through the closed end thereof and leading within the container to the upper portion thereof, a second pipe in communication with the second conduit through the closed end thereof and leading within the container to the lower portion thereof, a fan mechanism for circulating air through the container, pipes and conduits, and means for admitting fresh air to the conduit with which the outlet pipe communicates.

4. An apparatus for preserving meat or the like comprising, in combination, a normally closed container for holding the material to be preserved, superimposed conduits having similar ends closed and the opposite ends in communication, said conduits being arranged in an external atmosphere of a temperature lower than the temperature of the atmosphere surrounding the container, an outlet pipe in communication with one of the conduits through the closed end thereof and leading within the container to the upper portion thereof, a second pipe in communication with the second conduit through the closed end thereof and leading within the container to the lower portion thereof, a fan mechanism for circulating air through the container, pipes and conduits, and a moistening medium within the conduit with which the outlet pipe communicates.

5. An apparatus for preserving meat or the like comprising, in combination, a normally closed container for holding the material to be preserved, superimposed conduits having similar ends closed and the opposite ends in communication, said conduits being arranged in an external atmosphere of a temperature lower than the temperature of the atmosphere surrounding the container, an outlet pipe in communication with the upper conduit through the closed end thereof and leading within the container to the upper portion thereof, a second pipe in communication with the lower conduit through the closed end thereof and leading within the container to the lower portion thereof, and a fan mechanism interposed in the second pipe for circulating air through the container, pipes and conduits, said pipes being within the container adjacent a wall thereof and having nozzles disposed toward an opposed wall.

6. An apparatus for preserving meats or the like comprising, in combination, a normally closed container for holding the material to be preserved, superimposed conduits having similar ends closed and the opposite ends in communication, said conduits being arranged in an external atmosphere of a temperature lower than the temperature of the atmosphere surrounding the container, an outlet pipe in communication with one of the conduits through the closed end thereof and leading within the container to the upper portion thereof, a second pipe in communication with the second conduit through the closed end thereof and leading within the container to the lower portion thereof, a fan mechanism for circulating air through the container, pipes and conduits, a moistening pan within one of the conduits, and a sliding lid overlying the pan for regulating the moistening of the air through the medium of the liquid within the pan, said lid being operable from without the conduit.

In testimony whereof I hereunto affix my signature.

JAMES H. BIESEN.